Fig. 1. 200x
PERLITE AGGREGATE FROM VERTICAL EXPANDER
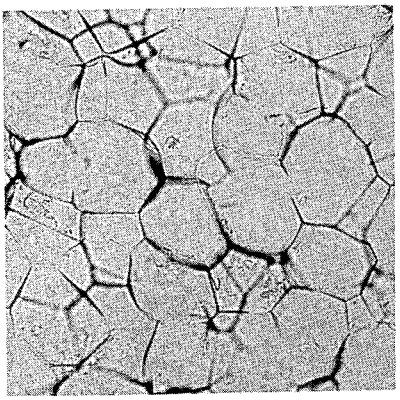
Fig. 2. 200x
PERLITE AGGREGATE FROM HORIZONTAL EXPANDER
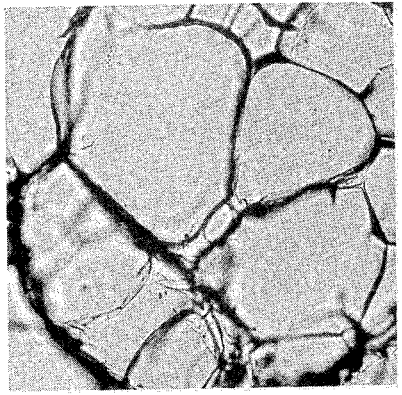
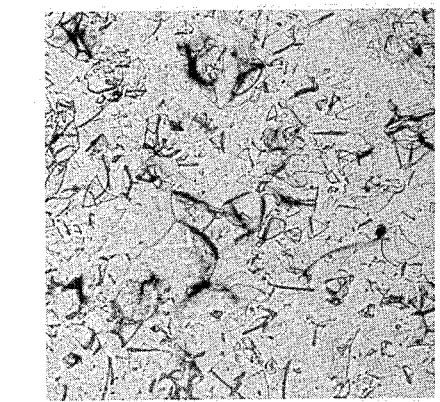
PERLITE FILTER AID VERTICAL EXPANDER
200 X
Fig. 3.
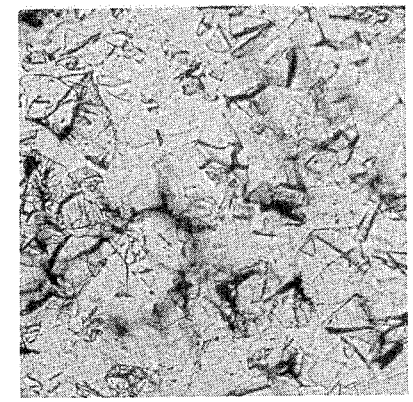
PERLITE FILTER AID FROM HORIZONTAL EXPANDER
200 X
Fig. 4.
INVENTORS:
CARL R. VANDER LINDEN
RAYMOND G. RIEDE
BY
ATTORNEY

United States Patent Office 3,233,740
Patented Feb. 8, 1966

3,233,740
HIGH FLOW RATE PERLITE FILTER AIDS
Carl R. Vander Linden, Bound Brook, and Raymond G. Riede, Martinsville, N.J., assignors to Johns-Manville Corporation, New York, N.Y., a corporation of New York
Filed June 2, 1961, Ser. No. 114,495
4 Claims. (Cl. 210—500)

This invention relates to a new method of producing perlite filter aids and the resulting product. More particularly, the invention relates to a new method of producing perlite filter aid products possessed of much higher flow rate characteristics than heretofore possible from perlite products prepared by conventional methods. This is particularly true with regard to ore found in New Mexico, especially in the No Agua area. By means of this invention it is now possible to manufacture perlite filter aids having the wide flow rate range of other commercially available filter aids such as diatomaceous silica.

HISTORY

In commercial usage the term "perlite" refers to any naturally occurring glass of igneous origin that will expand when heated to yield a light, cellular particle. The term is also applied to the expanded product. In strict geological usage the term is restricted to a single variety of volcanic glass in which strain incident to cooling has yielded a concentric or "onion" structure of fracturing which may be visible to the naked eye or observable under the microscope. The volcanic glasses that expand on heating to a commercially useful product generally have a chemical composition corresponding to that of rhyolite when computed on a water-free basis, although some are dacite.

Perlite rock usually is brittle, friable and colored tan to grey; however, wide variations from the classical appearance have been observed in both texture and color. It is found throughout the world, although it is restricted to areas of acid volcanic occurrence. In the United States such areas occur only in the western part of the country.

Commercially usable perlite generally has a silica content of greater than 70% and a combined water content of from about 2 to about 5%. Acid volcanic glasses containing less combined water than perlite are classed as obsidians, and those containing more combined water as pitchstone. In addition to silica and water, perlite contains alumina, soda, potash and lesser amounts of other constituents.

When perlitic particles are introduced into a flame and expanded under a control temperature on the order of 1600° F., the softening of the glass, coincidental with the volatilization and release of the combined water causes the particle to "pop," expand, or puff up to an aggregate many times its original volume. However, dependent on its origin, perlite minerals differ markedly on the time and temperature necessary for expansion with the control temperature varying generally between 1400° F. and 2000° F. It is realized of course that the actual flame temperatures are much higher, but these are not normally measured.

With such a wide range of temperature, care must be exercised to effect the expansion. For example, if the particles are heated too slowly, the combined water is driven off through the pores of the particles, and the particles become calcined without any appreciable expansion. These calcined particles are characterized as porous particles of practically the same size and density of the original particles. On the other hand, if too rapid heating is effected, the particles tend to explode upon expanding, resulting in numerous fines. It should be understood that the degree of expansion is further dependent, to some extent, on the combined water and particle size among other factors.

Properly expanded particles are cellular inasmuch as they are small spherical to irregular masses of minute glass bubbles. Being in the nature of glass, perlite is inert to water, and being highly cellular, it possesses excellent heat insulating properties. Likewise, as its density is low, as described below, large volumes of it may be employed where weight is an important factor to be taken into consideration.

Generally the expanded lightweight particles weigh from about 2 to 10 lbs./cu. ft., as opposed to a density of about 60 to 80 lbs./cu. ft. in the unexpanded state. Aggregates in the 5 to 10 lbs./cu. ft. range find commercial value as thermal insulation, acoustical insulation, and plaster and cement aggregates, as well as other applications. The lighter weight particles in the density range of about 2 to about 5 lbs./cu. ft. have found good application for cryogenic insulation and especially in the manufacture of filter aids.

Certain perlite filter aid products produced to date, particularly those from ores from the vicinity of No Agua, N. Mex., have met with certain deficiencies and particularly have been characterized by their inability to function as high flow rate filter aids. This is believed also to be true of many other ore sources in the western United States.

In order to evaluate the flow rate characteristics of particles, a test has been devised whereby the relative filtration rate of particulate filter aids may be determined. Figures are obtained based upon the average filtration rate in ml./sec. of a ½% solids slurry of the filtr aid through a 2 in. diameter, 325 mesh screen filter at 200 mm. mercury pressure differential. This number has been termed "alpharate" for ease of identification. Heretofore, maximum alpharates of about 50 have been obtained with perlite filter aids, whereas alpharates as great as 4 times that figure have been obtained with commercially available diatomaceous silica filter aid products; for example, "Celite 545" (a diatomaceous silica filter aid marketed by Johns-Manville Corp.) has an alpharate of about 200. The figures for each individual filter aid do not represent an important property but attain a significant value when they are compared to determine the relative flow rates of various products.

Heretofore manufacturers of perlite filter aids have used vertical expanding furnaces or an inclined stationary furnace to achieve the desired low density aggregate needed for filter aid manufacture. Horizontal furnaces have been commonly used for manufacture of a heavier density aggregate for plaster and concrete aggregates. Examples of methods employing the horizontal furnace or similar apparatus may be found in U.S. Letters Patent Nos. 2,501,962, 2,505,249, 2,602,782 and 2,621,160. Illustrative of the vertical processes are U.S. Letters Patent Nos. 2,536,742, 2,550,877, 2,639,132 and 2,666,632.

A test procedure has also been devised for the determination of floater content. It is to be noted, however, that as the flow rate is increased, the floater content generally increases so floater content as high as 10% for an alpharate of about 170 might not be unsatisfactory. It is highly desirable, however, to keep the floater content as low as possible. This method is described as follows:

Weigh up 4 grams of sample and split this into two equal portions and place in 50 ml. test tubes. Fill the test tube with deionized water to approximately ½ in. from top and stir using a stirring rod that can be closely fitted with glass tubing. The floaters that remain on the glass rod can be removed easily by sliding the glass tubing down over the rod. Place sample in centrifuge for 3 minutes at 1800 r.p.m. Remove the floaters from test tubes by suction directly on No. 4 Whatman filter paper. The apparatus for this is simply arranged as follows: Place the large end of #15 rubber stopper on the rim of a 7 cm. Büchner funnel in a filter flask. The one hole rubber stopper should have glass tubing connected to rubber suction tubing. The suction intake should be a tapered glass tip to reduce flow but with a large enough opening to prevent larger particles plugging the opening. The floaters that remain within the suction tubing can be collected by drawing deionized water through it. The rubber stopper should have an attachment for breaking up the direct flow on the filter paper. This can be held in place by a couple of stright pins. Suction of approximately 8 in. mercury should be sufficient. Transfer the floaters from the Büchner funnel to a crucible to dry. The samples are weighed after drying to obtain percentage of floaters based on the 4 gram initial sample.

By this method a floaters content of 4% is considered to be the maximum amount acceptable for an alpharate of about 70.

Again with regard to the high flow rate perlite filter aids, it should be mentioned that attempts have been made which have successfully raised the flow rate by lessening the intensity of milling and other process steps subsequent to expansion. But it should likewise be noted that this was achieved only at the expense of increasing the floaters content beyond an acceptable maximum limit mentioned above.

Consequently, the desire for a high flow rate perlite filter aid prepared from the aforementioned ore, capable of competing with other products such as diatomaceous silica, remained in the art.

OBJECTS

It is accordingly a principal object of this invention to provide new products which overcome the above-mentioned disadvantages and to provide a new method for producing same.

It is a further object of this invention to provide new expanded perlite products possessed of new and useful properties.

It is another object of this invention to provide new perlite filter aid materials characterized by flow rate properties substantially equivalent to high flow rate characteristics of other filter aid materials such as diatomaceous silica.

It is still another object of this invention to provide new perlitic filter aid materials characterized by high flow rate properties and further characterized by acceptable maximum floater content.

It is a further object of this invention to provide new expanded perlite aggregates produced from No Agua, N. Mex., ore deposits or similar ore deposits which can be processed into filter aids, characterized by flow rate properties heretofore unobtainable in perlite aggregates from that ore.

Another object of this invention is to provide a new method of producing a new perlitic product from No Agua, N. Mex., ore deposits or similar ore deposits useful as a filter aid characterized by high flow rate characteristics heretofore unobtainable in perlite filter aids produced from that ore.

It is still a further object of this invention to provide a novel method of producing filter aids from perlite whereby the flow rate characteristics may be increased without an accompanying increase in floater content beyond the acceptable maximum.

Other objects and further scope of applicability of the present invention will become apparent from the accompanied drawings and the detailed description given hereinafter.

In the drawings:

FIGURE 1 is a photomicrograph, 200×, of a perlite aggregate produced by vertical expansion;

FIGURE 2 is a photomicrograph, 200×, of a perlite aggregate from the same crude as that illustrated in FIG. 1 produced by horizontal expansion;

FIGURE 3 is a photomicrograph, 200×, of a perlite filter aid produced from the aggregate illustrated in FIG. 1; and FIGURE 4 is a photomicrograph, 200×, of a perlite filter aid produced from the aggregate illustrated in FIG. 2.

BRIEF DESCRIPTION OF THE INVENTION

It has been susprisingly discovered that the foregoing disadvantages may be overcome and that the flow rate characteristics of perlite filter aids may be vastly improved to the extent of doubling or further improving them by expanding proper graded crude at temperatures at or near the point of incipient fusion under a rolling and tumbling action such as that effected by a rotating horizontal expanding furnace. In such a furnace the perlite can be heated to incipient fusion so that agglomerates are formed by rolling and tumbling as they move to the discharge end of the expander. This results in the new and unusual particle structure having a density of between about 2 and about 4 pounds per cubic foot. The resulting aggregate is subsequently milled and classified to produce new filter aid products. Similar results could be obtained by oscillation or vibration of other expanding tubes which will allow formation of the agglomerate.

Comparative data between products expanded by employing vertical expansion furnaces and products from the same crude expanded by employing the technique of the instant invention and subsequently milled and classified in the same filter aid processing equipment, have evidenced that alpharates may be improved from rates of about 40, corresponding to vertical expanded perlite, to a new rate of about 70 to 100. It has been further discovered that by additional air classification, filter aids with alpharates as high as about 130 may be produced. For purposes of this invention as disclosed and claimed herein, alpharate shall have that meaning as hereinabove defined.

SPECIFIC DESCRIPTION OF THE INVENTION

A more complete understanding of the invention may be obtained by reference to the following examples of actual operations carried out in accordance with the invention. In these examples all parts and percentages are by weight unless otherwise indicated. The horizontal furnace used in Example I has separate tubes, one for preheat and the other for expanding the ore. The previously mentioned U.S. Letters Patent No. 2,501,962 illustrates the type of furnace used.

Example I

Perlite ore from No Agua, N. Mex., graded 30 to 100 mesh, was used. This ore which is characteristic of perlite ore, has a general chemical composition comprising in the following approximate percentages by weight on a moisture-free basis 71–75% $SiO_2$, 12.5–18% $Al_2O_3$, 2.9–4% $Na_2O$ and 4–5% $K_2O$. Ore feed rate to the furnace was 1900 lbs./hr. Preheat ore temperature was 585° F. and expansion control temperature was 1605° F. An expanded aggregate with loose density of 3¾ lbs./cu. ft. was secured. This aggregate was fed directly to a filter aid plant consisting of milling and classifying equipment. The filter aid yield from the aggregate milling and classification step was 85.7% of the total material recovered. The balance consisted of 8.6% of a baghouse fraction and 5.7% of a coarse waste fraction. The filter aid fraction had the following properties:

Alpharate _____ 93
Cake density, p.c.f. _____ 12.5
Sugar filtration test:
    Comparable standard _____ [1] "Celite 535"

Filtration rate, percent _____ 86
Clarifying capacity, percent _____ 74
Floaters, percent _____ 2.3

[1] A diatomaceous silica product marketed by Johns-Manville Corp.

By further air classification the filter aid product illustrated above was separated into two fractions, one coarser than the other. The coarser fraction constituted 35% of the yield and the finer fraction 65% of the yield. These fractions tested as follows:

| | Coarse fraction | Fine fraction |
|---|---|---|
| Alpharate | 129 | 79 |
| Cake density, p.c.f. | 13.0 | 12.5 |
| Sugar filtration test: | | |
| Comparable standard | "Celite 535" | 79 |
| Filtration rate, percent | 114 | 79 |
| Clarifying capacity, percent | .97 | 88 |
| Floaters, percent | 3.0 | 2.0 |

Example II

In order to provide a basis of comparison, the following data were secured from the conventional method of manufacturing filter aids by use of a vertical expander furnace. The same ore, No Agua, graded 30 to 100 mesh was used. The furnace had a lower capacity than the horizontal furnace and, consequently, the ore feed rate was reduced to about 1500 lbs./hr. Expansion control temperature is 1600° F. Loose density of the expanded aggregate is 3 to 3½ lbs./cu. ft. Material balance after processing the expanded aggregate is approximately 88% filter aid, 8% baghouse, and 4% coarse waste. Typical properties of the filter aid are as follows:

Alpharate _____ 40
Cake density, p.c.f. _____ 13
Sugar filtration test, vs. "Celite 501":[1]
  Filtration rate, percent _____ 90
  Clarifying capacity, percent _____ 85
Sugar filtration rate vs. "Celite 535," percent _____ 53
Floaters, percent _____ 3.0

[1] A diatomaceous silica product marketed by Johns-Manville Corp.

The above are typical product properties of "Celite J5," a standard perlite filter aid marketed by Johns-Mansville under that trademark.

For reference, the sugar flow rate relationship between "Celite 501" and "Celite 535" is 100 to 172.

The specific location of the ore used in the above examples is the Seven Hills of Taos deposit of the Johns-Mansville Perlite Corp. Similar results were also secured by using ore from the No Agua deposit of Great Lakes Carbon Corp.

It is further noted that while preheat was used in Example I and is the preferred method of processing, similar results can be obtained without the use of preheat. The latter method is not preferred, however, because the higher degree of particle shattering due to sudden expansion causes excessive dust and increases stack losses.

The most significant observation regarding the above data is the fact that vastly improved flow rate characteristics are achieved from the same ore by expanding the material by horizontal expansion techniques. By this method of furnacing, aggregates in the 3 to 4 lbs./cu. ft. range can be made, which can be processed into filter aids with high flow rates. It is also important to note that these high flow rate materials have a floater content which generally does not exceed 3%.

It is to be noted that this invention is not restricted to the type of furnace herein described, but is also applicable to other types of commercial furnaces as for example, the rotary horizontal furnace, manufactured by the Perlite Corp. of Chester, Pa. This furnace has an inner and outer shell and the annular space between the two shells is used as a preheat chamber. Using this furnace, No Agua, N. Mex., 30/100 ore was expanded to densities of 4 to 4½ p.c.f. at rates of one ton per hour. When the aggregates were processed into filter aids, using the same equipment that was used for Example I, products with alpharates ranging from 77 to 90 resulted.

It was also discovered that in addition to being light enough in weight to make acceptable filter aids, these aggregates have an internal cellular structure which differs significantly from the structure of those aggregates produced from the same crude in a vertical furnace. The aggregates of the instant invention have an irregular internal cellular structure characterized by relatively thick cell walls and well developed, coarse junctions between the cells. By contrast, the internal cellular structure of perlite expanded in a vertical furnace consists of a pattern of thin walls and delicately formed cell junctions. These differences may be seen by contrasting the photomicrographs of FIGS. 1 and 2 herein. This difference appears to be attributable directly to the mode of expansion. In the vertical expansion the particles are suspended in an air column, unrestricted, and free to expand in all directions. In rotary horizontal expansion, a particle, tumbling and rolling in a horizontal furnace, is subject to shearing and restricting forces that can distort the internal cell structure, inhibit to some extent otherwise free expansion and produce a coarser walled irregular internal cell structure.

Still further, after milling, the horizontally produced aggregates result in a high percentage of 3-dimensional structure formed by the resistant internal cell junctions. Such structure is conducive to a relatively permeable filter cake. When structure such as that produced from the vertical expansion of the same crude is milled, a preponderance of the resulting particles, i.e., greater than about 50% by microscopic count, is generally thin flat plates that lie flat in the filter cake and produce a low degree of permeability. This difference is evidenced by the photomicrographs of FIGS. 3 and 4.

This difference in structure is reflected in particle size distribution differences between products made by the two methods of expansion.

A sedimentation method, known as the Klein hydrometer method, was used for the determination of particle size determination. In this method a calculated weight of sample based on specific gravity is dispersed in aqueous suspension. At periodic intervals the gravity of the suspension is measured with a specially calibrated hydrometer (the Klein hydrometer). The gravity determinations are converted into percent wt. of sample in suspension, and from Stokes' law, the limiting particle diameter is computed at the time of gravity measurement. These data are than plotted as a cumulative particle size distribution curve from which the information may be taken. These particle size data are listed below in Table 1.

TABLE 1

| Particle size, microns | Filter aid from Example I Alpharate=93 | Filter aid from Example II Alpharate=40 |
|---|---|---|
| | Percent | Percent |
| >40 | 12.6 | 4.1 |
| 40–20 | 37.4 | 11.5 |
| 20–10 | 29.2 | 38.4 |
| 10–8 | 6.6 | 14.0 |
| 8–6 | 5.9 | 14.0 |
| 6–4 | 4.7 | 9.4 |
| 4–2 | 2.3 | 3.9 |
| <2 | 1.0 | 4.7 |

It was noted that the filter aid from Example I had a much coarser particle size than the filter aid from Example II.

The ore used for producing the novel filter aids should also be properly pregraded so as to have a preponderance of its particles sized between 30 and 100 mesh for best results.

CONCLUSION

It is therefore seen from the foregoing that new high flow rate perlitic filter aids may be produced. This is particularly so when the ore is of the nature of that obtained from the No Agua, N. Mex., vicinity. Other deposits may likewise be benefited. The new material is characterized as possessing flow rates approximately from 2 to 3 times or greater than those heretofore obtainable from the same crude. Moreover, these new products make it now possible to produce perlite filter aids which are substantially equivalent in flow rate to fast flow rate diatomaceous silica products. It is also be to particularly noted that even with these high flow rates, the floaters content is kept well below the tolerable maximum.

It is believed the above provides a complete description of the invention in such manner as to distinguish it from other inventions and from what is old, and provides a description of the best mode contemplated of carrying out the invention and thereby complies with the Patent Statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What is claimed is:

1. A method of producing light weight perlite products comprising rolling and tumbling perlite ore having a chemical composition on a moisture-free basis comprising in approximate percentages by weight 71–75% $SiO_2$, 12.5–18% $Al_2O_3$, 2.9–4% $Na_2O$, and 4–5% $K_2O$ through a substantially horizontal path, said ore having a particle size distribution of between about 30 and about 100 mesh, heating the ore while traveling through said path to approximately the point of incipient fusion of said ore and between about 1600° and about 2000° F. to expand said ore directly to a product having a density between about 2 and about 4 pounds per cu. ft. and approximately a 85.7 to 88% fraction having an alpharate of at least 70, said alpharate being defined in the instant specification, and a maximum floater content of 4%.

2. A light weight perlite product consisting of expanded perlite having a chemical composition on a water-free basis comprising in approximate percentages by weight 71–75% $SiO_2$, 12.5–18% $Al_2O_3$, 2.9–4% $Na_2O$, and 4–5% $K_2O$ having a high percentage of three dimensional structures formed of resistant internal cell junctions and characterized by a density between about 2 and about 4 pounds per cu. ft., a maximum floater content of 4%, and an alpharate of at least 70, said alpharate being determined in accordance with the test as set out in the instant specification.

3. A perlite product as defined in claim 1 further characterized as having about 85.7 to 88% of the particle size distribution between 2 and 40 microns.

4. A perlite product as defined in claim 3, and adapted for use as a filter aid, having a particle size distribution as follows:

| Particle size: | Percent |
|---|---|
| >40 microns | 12.6 |
| 40–20 | 37.4 |
| 20–10 | 29.2 |
| 10–8 | 6.6 |
| 8–6 | 5.9 |
| 6–4 | 4.7 |
| 4–2 | 2.3 |
| <2 microns | 1.0 |

References Cited by the Examiner

UNITED STATES PATENTS

| 1,756,906 | 4/1930 | Miketta | 210—500 |
| 2,798,674 | 7/1957 | Denning | 210—500 XR |
| 2,853,241 | 9/1958 | Gindoff et al. | 252—378 |
| 2,939,693 | 6/1960 | Old et al. | 252—378 |
| 2,956,016 | 10/1960 | Teppla | 210—500 XR |

FOREIGN PATENTS 791,993  3/1958  Great Britain.

JULIUS GREENWALD, *Primary Examiner.*

CARL F. KRAFFT, *Examiner.*